United States Patent
Ihrefors

(10) Patent No.: US 9,371,075 B2
(45) Date of Patent: Jun. 21, 2016

(54) GUIDE RAIL PART FOR A CONVEYOR AND A CONVEYOR INCLUDING A GUIDE RAIL PART

(71) Applicant: Eton Innovation AB, Gånghester (SE)

(72) Inventor: Per-Olof Ihrefors, Hyssna (SE)

(73) Assignee: Eton Innovation AB, Gånghester (SE)

( * ) Notice: Subject to any disclaimer, the term of this patent is extended or adjusted under 35 U.S.C. 154(b) by 0 days.

(21) Appl. No.: 14/388,766

(22) PCT Filed: Mar. 27, 2013

(86) PCT No.: PCT/SE2013/050341
§ 371 (c)(1),
(2) Date: Sep. 26, 2014

(87) PCT Pub. No.: WO2013/147692
PCT Pub. Date: Oct. 3, 2013

(65) Prior Publication Data
US 2015/0021147 A1  Jan. 22, 2015

(30) Foreign Application Priority Data
Mar. 28, 2012 (SE) .................... 1250308

(51) Int. Cl.
 *B65G 17/20* (2006.01)
 *B61B 10/02* (2006.01)
(Continued)

(52) U.S. Cl.
CPC .............. *B61B 10/02* (2013.01); *B61B 10/001* (2013.01); *B65G 17/20* (2013.01); *B65G 19/02* (2013.01);
(Continued)

(58) Field of Classification Search
CPC ........................ B65G 47/266; B65G 47/8823

USPC ............... 198/459.6, 459.7, 460.1, 678.1; 104/250, 252, 253; 193/35 A
See application file for complete search history.

(56) References Cited

U.S. PATENT DOCUMENTS 1,819,032 A    8/1931  Lehman
2,770,350 A *  11/1956 Hoffmeister ......... B65G 47/266
                                                    198/634
(Continued)

FOREIGN PATENT DOCUMENTS

DE    960103 C1    3/1957
FR    2756548 A1   6/1998
(Continued)

OTHER PUBLICATIONS

International Search Report received in corresponding International Patent Application PCT/SE2013/050341 mailed on Dec. 8, 2013 in 4 pages.

*Primary Examiner* — William R Harp
(74) *Attorney, Agent, or Firm* — Knobbe Martens Olson and Bear, LLP

(57) ABSTRACT

Guide rail part for a conveyor adapted to convey product carriers in a hanging manner, where the guide rail part is adapted to be positioned centrally in a main rail of the conveyor, where the guide rail part comprises a body, wherein the guide rail part comprises an actuator pivotably suspended to the body, where the actuator is movable from a first upper position to a second lower position, and a stop member pivotably connected to the actuator such that the stop member is in a raised stop position when the actuator is in the second lower position and that the stop member is in a lowered bypass position when the actuator is in the first upper position. The advantage of the guide rail part is that a queue with product carriers can be realized, where the spacing between the product carriers is obtained with the guide rail parts in an easy and cost-effective way.

15 Claims, 4 Drawing Sheets

(51) Int. Cl.
  *B65G 19/02* (2006.01)
  *B65G 47/88* (2006.01)
  *B61B 10/00* (2006.01)
  *B65G 47/26* (2006.01)
  *B65G 9/00* (2006.01)

(52) U.S. Cl.
  CPC ............ *B65G 47/26* (2013.01); *B65G 47/8823* (2013.01); *B65G 9/006* (2013.01); *B65G 2201/0247* (2013.01)

(56) References Cited

U.S. PATENT DOCUMENTS

| | | | | |
|---|---|---|---|---|
| 2,787,364 | A * | 4/1957 | Beck | B65B 25/04 198/634 |
| 3,532,201 | A * | 10/1970 | McConnell | B65G 47/29 193/35 A |
| 3,800,710 | A | 4/1974 | Raoulx | |
| 4,185,729 | A * | 1/1980 | Obermeyer | B65G 47/261 193/35 A |
| 4,646,909 | A * | 3/1987 | vom Stein | B65G 1/08 193/35 A |
| 5,016,539 | A * | 5/1991 | Feuz | B61B 7/02 104/249 |
| 5,213,189 | A * | 5/1993 | Agnoff | B65G 47/8823 193/35 A |
| 5,884,564 | A | 3/1999 | Fountas | |
| 5,890,577 | A * | 4/1999 | Faisant | B65G 1/08 193/35 A |
| 6,189,672 | B1 * | 2/2001 | Schut | B65G 1/08 193/35 A |
| 2002/0027060 | A1 * | 3/2002 | Boller | B65G 47/266 198/460.1 |
| 2014/0116838 | A1 * | 5/2014 | Ribau | B65G 47/8823 193/35 A |

FOREIGN PATENT DOCUMENTS

| | | |
|---|---|---|
| GB | 885905 A | 1/1962 |
| GB | 1046597 A | 10/1966 |
| GB | 1259925 A | 1/1972 |
| SE | 357533 B | 7/1973 |
| SE | 410165 B | 10/1979 |
| SE | 464188 B | 3/1991 |

\* cited by examiner

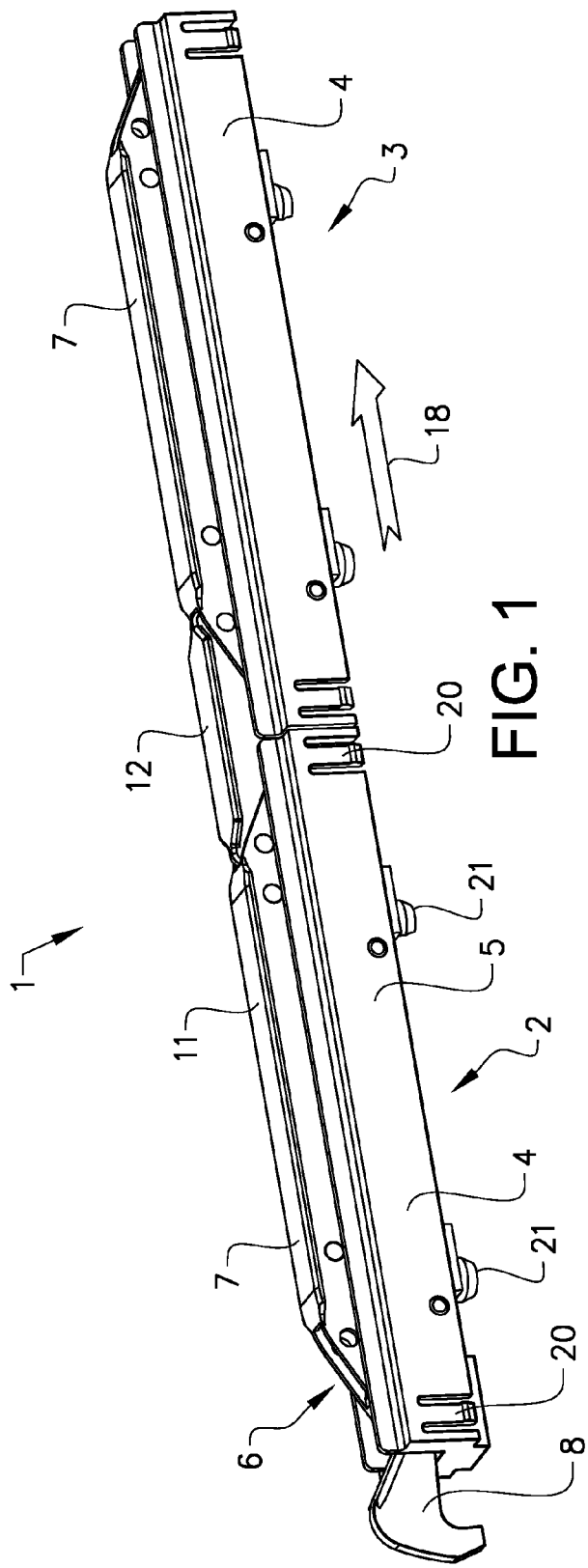
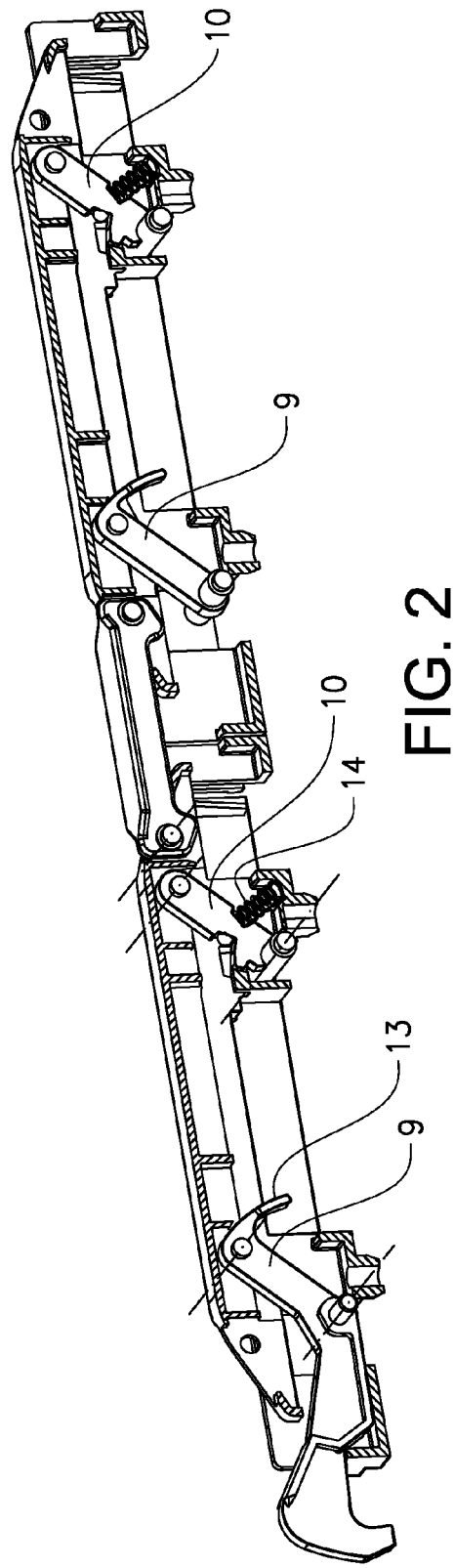

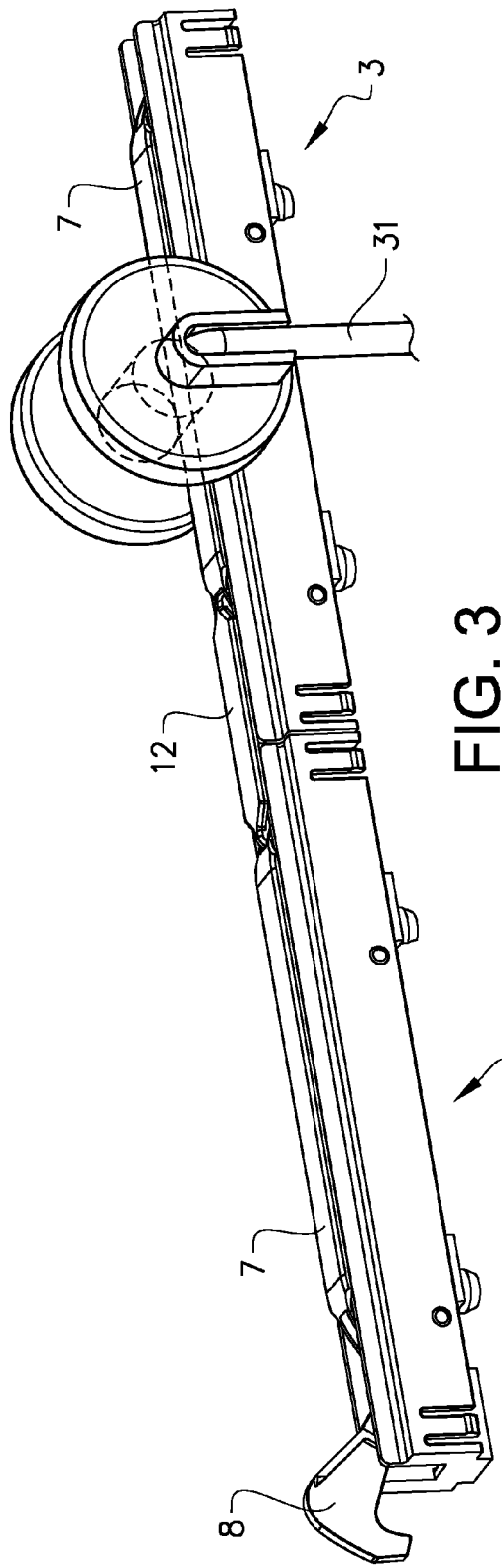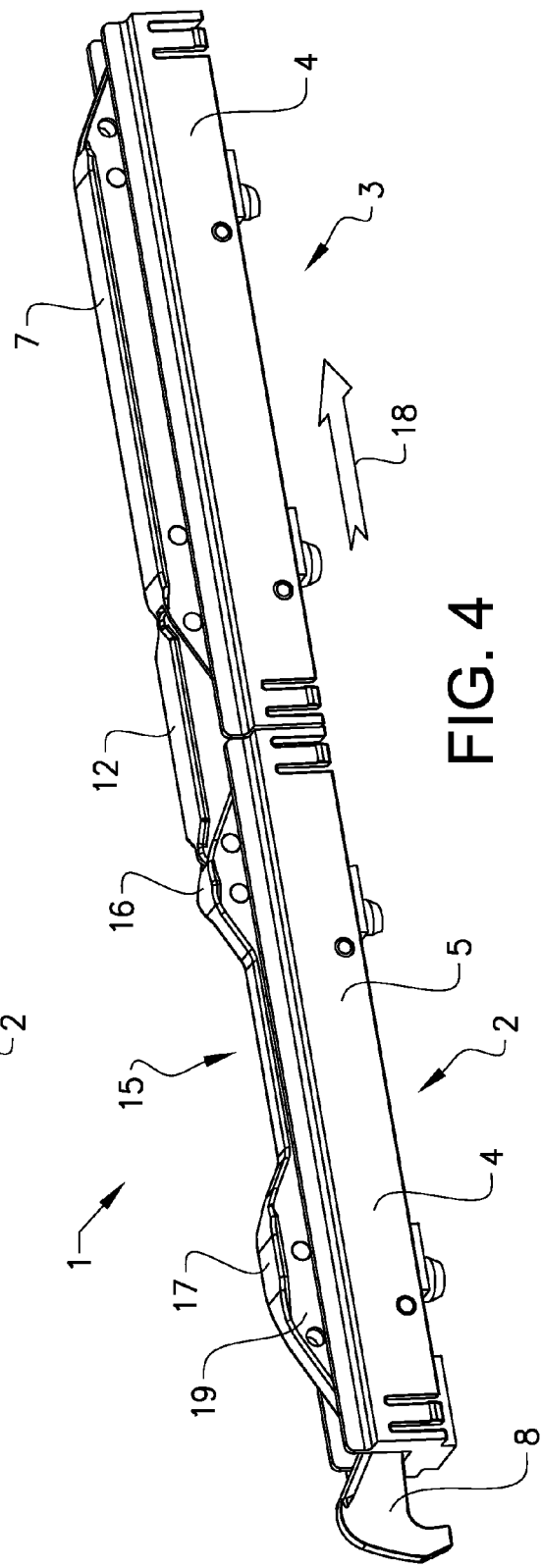

GUIDE RAIL PART FOR A CONVEYOR AND A CONVEYOR INCLUDING A GUIDE RAIL
PART

CROSS-REFERENCE TO RELATED APPLICATIONS

This application is the U.S. National Phase under 35 U.S.C. §371 of International Application PCT/SE2013/050341, filed Mar. 27, 2013, which claims priority to SE 1250308-2, filed Mar. 28, 2012.

TECHNICAL FIELD

The present invention relates to a guide rail part comprising a stop function for a conveyor carrying hanging goods. The goods are held by a product carrier that rolls on a main conveyor rail, where the guide rail part is positioned centrally on the main rail, thereby guiding the product carrier sideways.

BACKGROUND ART

Conveyors that carry products in a hanging manner are commonly known in textile factories, e.g. for sewing shirts, wherein different pieces of cloth hangs in a product carrier, which travels on a rail to a workstation, where all or part of the pieces are to be sewn together. The product carrier consists of two wheels held together by an axis. The wheels are intended to roll on the support surfaces of the main rail and are guided in the sideway direction by a centrally positioned guide rail.

The guide rail may be integrated in the main rail, which gives a cost-effective straight rail. However, when a product carrier is to leave or enter the main rail, a switch adapted to divert the product carrier to or from the main rail must be used. With the guide rail integrated in the main rail, the main rail must be cut off in order to be able to insert a complete switch module in the main rail. This gives an inflexible solution which is difficult to rebuild or change.

It is also known to use a separate guide rail being a straight beam that is mounted to the main rail. In this way, the main rail does not have to be cut in order to insert a switch unit. In this solution, the guide rail is cut off in order to insert a switch unit. This provides a more flexible solution, which still is somewhat difficult to rebuild. Such a solution is known from WO 9854074.

By providing guide rails in a modular design, an even more flexible solution is provided, in which one or a few guide rail elements can be easily removed from the main rail in order to provide space for a switch element. Each guide rail element is positioned in predefined mounting positions, having mounting holes for the attachment of the guide rail elements. Preferably, the switch element is also of a modular design. Such a solution is known from WO 2007018462, which is hereby incorporated as reference.

Depending on the use of the product carriers, i.e. the goods carried by the product carriers, there may be a need to separate the product carriers from each other, such that they do not bump in to each other or such that the goods carried by the product carriers do not bump in to each other. If the products are soft, they may entangle or get caught in each other if they touch each other, and if the products are larger and harder, they may deform or damage each other if they are allowed to run into each other.

Different solutions to this problem are known. In one solution, the product carriers are provided with an integrated spacer that will give a defined distance between each product carrier. The spacers will bear on each other and will thus provide a defined distance between each product carrier without the need of specific stop elements. The product carriers may also be provided with a protective cover which holds the products apart.

It is also possible to introduce different stop elements in the conveyor. Such stop elements are commonly used before a work station in order to release a product carrier when the work station is ready to receive a new product carrier. The stop element is controlled by a control unit of the conveyor system. It is however impractical to provide a plurality of active stop elements in order to allow the product carriers to queue with a predefined distance apart.

These solutions work fine in some systems, but there are still room for improvements.

DISCLOSURE OF INVENTION

An object of the invention is therefore to provide an improved guide rail part which has an integrated stop member. A further object is to provide an improved guide rail part with an integrated stop member which is adapted for a product carrier trolley having two wheels. A further object of the invention is to provide a guide rail assembly which is modular and by which a required spacing can be obtained.

In a guide rail part for a conveyor adapted to convey product carriers in a hanging manner, where the guide rail part is adapted to be positioned centrally in a main rail of the conveyor, where the guide rail part comprises a body, the object of the invention is achieved in that the guide rail part comprises an actuator arranged pivotably suspended to the body, where the actuator is movable from a first upper position to a second lower position and a stop member pivotably connected to the actuator such that the stop member is in a raised stop position when the actuator is in the second lower position and that the stop member is in a lowered bypass position when the actuator is in the first upper position.

By this first embodiment of the guide rail part according to the invention, the guide rail part will comprise a stop member connected to an actuator. The actuator is controlled by a product carrier such that the stop member will stop further product carriers to enter the guide rail part as long as a product carrier is present at the guide rail part. When the product carrier leaves the guide rail part, the stop member will allow a new product carrier to enter the guide rail part. When the new product carrier enters the guide rail part, the new product carrier will actuate the actuator such that the stop member will stop another product carrier to enter the guide rail part. By arranging several guide rail parts after each other, an automatic queue function with a predefined spacing is obtained.

In an advantageous development of the invention, the actuator is pivotably suspended to the body by two pivot arms. In this way, the upper surface of the actuator is parallel to the upper surface of the body both in the first upper position and in the second lower position. The advantage of this is that the actuator will be actuated when the product carrier is at any position on the guide rail part.

In an advantageous development of the invention, the actuator is pushed to the first upper position by a resilient member. The resilient member is selected such that the actuator is pushed down by a product carrier. In this way, the stop member is down when there is no product carrier bearing on the actuator, i.e. the guide rail part is empty, which means that a product carrier can enter the guide rail part. As soon as the product carrier has entered the guide rail part, the actuator is pushed down and the stop member will stop further product carriers to enter.

In an advantageous development of the invention, the upper surface of the actuator comprises an intermediate recess between a forward part and a rearward part of the actuator. The advantage of this is that a product carrier trolley comprising two spaced apart wheels will still be able to enter the guide rail part. Due to the recess, the first wheel will not push down the actuator when the second wheel is to pass the stop member, which allows the product carrier trolley to enter the guide rail part. When the trolley has passed the stop member, the wheels of the trolley will bear on the forward part and/or the rearward part of the actuator, such that the stop member will stop further product carrier trolleys to enter the guide rail part.

In an advantageous development of the invention, the guide rail part is modular such that the length of the guide rail part is defined as one length unit. Preferably, a length unit corresponds to predefined mounting positions of the modular guide rails used in the conveyor system, where the spacing of the mounting positions for the guide rail parts corresponds to the length unit. The length of a modular guide rail is thus a plurality of length units. It is possible to provide guide rail parts with different lengths, where one guide rail part is one length unit long and another guide rail part is e.g. two length units long.

In an advantageous development of the invention, one or more extension guide rail parts are connected to the guide rail part. The extension guide rail part comprises a body and an actuator arranged in the body, but does not comprise a stop member. By connecting the actuator of an extension guide rail part to the first guide rail part with a connecting member, a longer guide rail part is created which also detects if a product carrier bears on any part of the actuator surface. By connecting a number of extension guide rail parts to the first guide rail part, a guide rail part having a required length is obtained. The length of the obtained guide rail part assemblies sets the spacing between two product carriers or two product carrier trolleys. In this way, the same product carriers can be used to convey products having different shapes and sizes.

One advantage of this is that it is possible to set different spacing at different positions in a conveyor system. It is e.g. possible to set a relatively long spacing interval before a work station such that large products can queue without bumping into each other, and to set a short spacing interval before the loading station, where the product carriers are empty. Since the guide rail parts are designed in a modular way, it is easy to change the spacing at a work station if the product changes.

BRIEF DESCRIPTION OF DRAWINGS

The invention will be described in greater detail in the following, with reference to the embodiments that are shown in the attached drawings, in which FIG. 1 shows a guide rail part assembly comprising a guide rail part and an extension guide rail part according to the invention, FIG. 2 shows a cut view of the guide rail part assembly of FIG. 1, FIG. 3 shows the guide rail part assembly of FIG. 1 where the actuator is pushed down by a product carrier, FIG. 4 shows a development of a guide rail part according to the invention adapted for a product carrier trolley.

MODES FOR CARRYING OUT THE INVENTION

Figure 5:
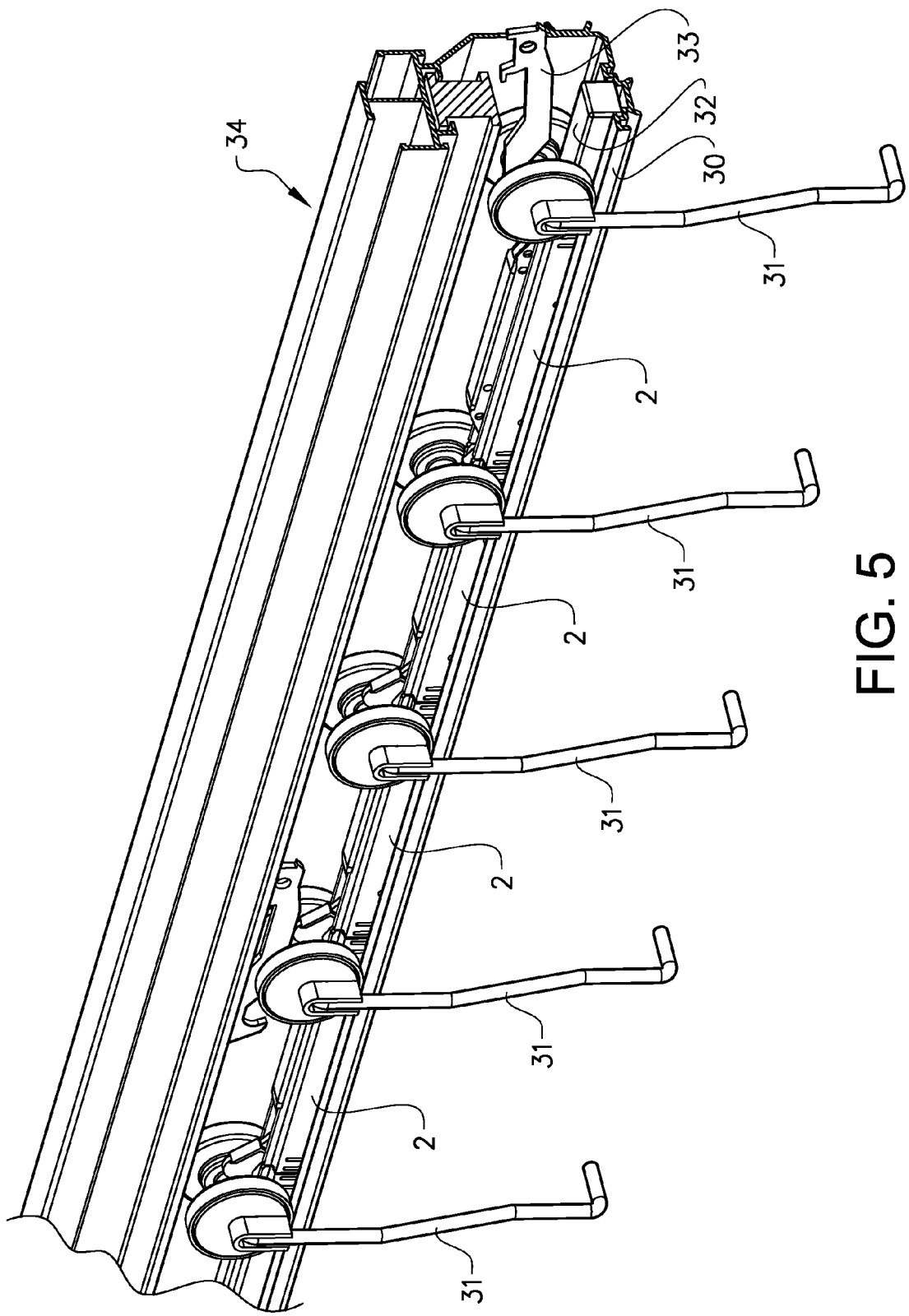
FIG. 5 shows part of a conveyor system comprising a plurality of guide rail parts according to the invention.

The embodiments of the invention with further developments described in the following are to be regarded only as examples and are in no way to limit the scope of the protection provided by the patent claims.

In FIGS. 1 to 3, a guide rail part assembly 1 comprising a guide rail part 2 and an extension guide rail part 3 is shown. The guide rail part 2 and the extension guide rail part 3 are connected to each other by a connecting member 12. A guide rail part assembly may comprise several extension guide rail parts 3 but will only have one guide rail part 2.

The guide rail part 2 comprises a longitudinal body 4. In the shown example, the body is hollow such that an actuator 7 can be arranged between the side walls 5, 6, inside the body. In this way, the longitudinal side walls 5, 6 will function as a guide rail for the product carrier wheels such that the wheels are guided on the conveyor rail. The actuator is movable from a first upper position to a second lower position. In FIGS. 1 and 2, the actuator is shown in the upper position. The actuator is suspended to the body by a first pivot arm 9 and a second pivot arm 10. The pivot arms are parallel such that the upper surface 11 of the actuator will always be parallel to the housing, regardless of position. The guide rail part 2 further comprises a stop member 8 pivotably connected to the actuator in such a way that the stop member is in a raised stop position when the actuator is in the second lower position and that the stop member is in a lowered bypass position when the actuator is in the first upper position. Consequently, the stop member is in FIGS. 1 and 2 shown in the lowered bypass position.

FIG. 2 shows a cut view of the housings of the guide rail part assembly of FIG. 1. Here, the first pivot arm 9 and the second pivot arm 10 can be seen. The stop member 8 is preferably, as in this example, integrated with the first pivot arm 9, even though a different linkage is also possible. The actuator is pushed to the upper position by a resilient member 14 acting between the housing and one of the pivot arms, here the second pivot arm 10. The first pivot arm is also provided with an interrupter 13 which is arranged to interrupt a light beam of an optical switch that can be mounted to the housing. In this way, it is possible to send a signal to a control unit when the actuator is actuated and thus when the stop function is activated.

The guide rail part is adapted to be mounted in the centre of a conveyor rail. The body of the guide rail part thus comprises fastening means, here in the form of resilient catches 20 adapted to grip a longitudinal notch in the conveyor rail. In order to be able to mount the guide rail parts in a modular way, the body further comprises mounting protrusions 21 adapted to fit mounting holes in the conveyor rail. In the conveyor rail, mounting holes are provided with a modular spacing, such that each mounting hole e.g. corresponds to a length unit.

In FIG. 3, the guide rail part assembly is shown in an actuated state, where the actuator is in the second lower position and the stop member is in the raised stop position. The actuator is actuated, i.e. pushed down, by a product carrier 31 which bears on the upper surface of an actuator 7. When the product carrier has entered the guide rail part assembly and bears on the upper side of the actuator, the stop member will stop any subsequent product carrier to enter the guide rail part assembly as long as the first product carrier is still resting on the guide rail part assembly. When the product carrier leaves the guide rail part assembly, the actuator will resume its idle upper position and the stop member will allow a new product carrier to enter the guide rail part assembly.

FIG. 5 shows a number of guide rail parts 2 arranged adjacent each other on a conveyor rail. In this example, a guide rail part 2 is used without any extension guide rail parts. The guide rail parts 2 are mounted in the centre of the conveyor rail 30 and will thus guide the product carriers 31 in the sideway direction, such that the product carrier will be able to roll in a controlled way on the conveyor rail. An externally controlled stop 32 is positioned in the front of the guide rail parts, at a position where the product carriers are to queue up before e.g. a work station.

Above the conveyor rail, there is arranged an endless conveyor chain 34 adapted to move the product carriers. The conveyor chain comprises a plurality of conveyor hooks 33 adapted to grip the wheel axle of the product carrier. A conveyor hook is pivotally suspended in the conveyor chain such that the hook can be either in a low position in which it can grip a product carrier or can be in a raised position in which it passes above the product carrier. In the shown example, the externally controlled stop 32 is deactivated which allows the conveyor hook to grip the first product carrier. When the stop 32 is activated, the stop member is in a raised position which stops the product carrier and that also holds the conveyor hook in a raised position when it passes the product carrier. When the first product carrier is pulled from the first guide rail part, the product carrier leaves the actuator of the first guide rail part. The actuator is thus pushed to its idle position which in turn lowers the stop member of the guide rail part. When the stop member is in the lower position, the next conveyor hook will be able to grip the product carrier and will pull this from the second guide rail part onto the first guide rail part which in turn will raise the stop member of the first guide rail part. When the product carrier leaves the second guide rail part, the stop member of the second guide rail part will allow the subsequent product carrier to be pulled onto the second guide rail part. In the same way, all product carriers waiting in the queue will move one step forwards in a synchronous way, on after the other. When the conveyor hook pulling a product carrier reaches a stop member of a preceding guide rail part that is in a raised stop position, the conveyor hook will ride on the stop member and will thus be pushed upwards such that the hook looses engagement with the axel of the product carrier. The product carrier will thus come to a stop at the stop member.

The spacing between the product carriers is set by the distance between each stop member. For smaller items, it suffices with a short spacing as shown in the example. For a longer spacing, the guide rail part is connected with a required number of extension guide rail parts, such that the required spacing is obtained. In this way, it is possible to use the same product carrier to carry a number of differently sized products in the same conveyor system. It is also possible to group the guide rail part assemblies in one cluster having one spacing at a work station when the product carriers carry a product and another guide rail part cluster, having a shorter spacing when the product carriers are empty at a loading station. This makes it possible to adapt the spacing at each work station individually to the requirements for that work station which will save space. It is an advantage to be able to use one type of product carrier and not having to use product carriers with different types of protection devices to separate the products carried or product carriers having a fixed length adapted for a specific product.

The guide rail part is preferably designed in a modular way such that the length of the guide rail part is defined as one length unit. A length unit may be e.g. 10 cm or 20 cm. The guide rail part is preferably adapted to be mounted in predefined mounting positions in a main conveyor having a spacing corresponding to the length unit or to a multiple of the length units. In one example, a conveyor is provided with a modular guide rail system, where a guide rail comprises straight modular guide rail parts, where each guide rail part is a length unit. The length of a modular guide rail is a multiple of length units. It is possible to provide guide rail parts with different lengths, where one guide rail part is one length unit long and another guide rail part is e.g. two length units long.

In such a system, one or more straight guide rail parts may be exchanged to another type of member, such as a modular diverter or switch having a length that is a multiple of length units. With the inventive guide rail parts, a queue function with a selectable spacing can easily be obtained at a work station in the conveyor system by replacing the straight guide rail parts with guide rail parts having a stop function. When the work station is to be removed, the modular design allows the queue function to be removed by replacing the guide rail parts including a stop function with plain straight guide rail parts. When the work station is to be modified or replaced, the modular design allows the queue function to be adapted to the new work station by inserting or removing one or more extension guide rail parts.

Figure 6:
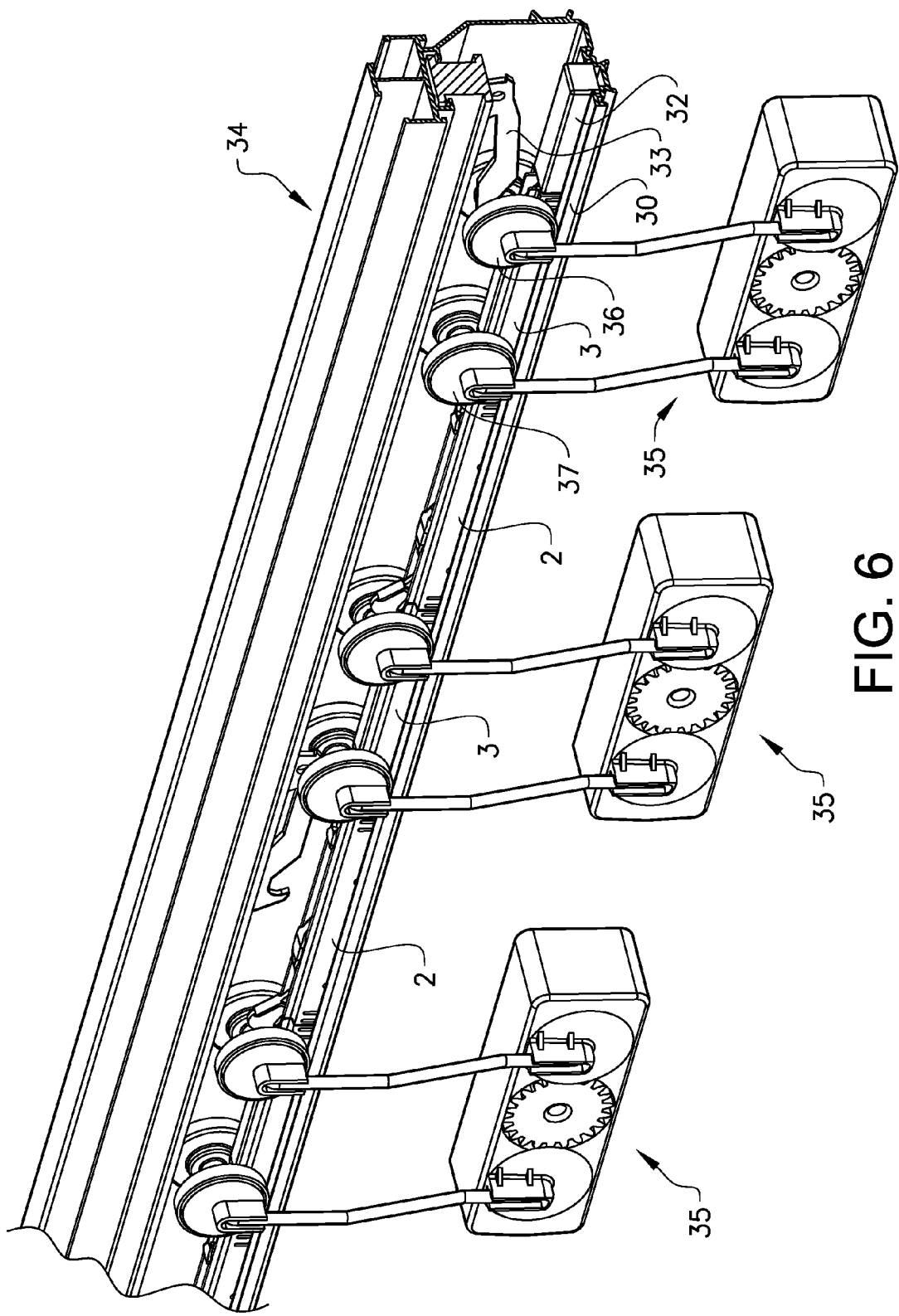
FIG. 6 shows part of a conveyor system comprising a plurality of guide rail parts adapted for a product carrier trolley according to the invention.

In a further development of the inventive guide rail part, shown in FIG. 4, the first guide rail part is adapted for a product carrier trolley 35 comprising two spaced apart wheels 36, 37 carrying a trolley adapted for heavier products. The housing of the extension guide rail part is the same as described above, with an actuator 19 that is provided with a recess 15 in the middle part of the actuator 19. The forward section 16 and the rearward section 17 resemble the actuator 7, i.e. has the same height as the actuator 7 in the upper position. When the actuator 19 is in the upper position, the recess 15 will be approximately at the same level as the upper part of the housing 4. When a wheel of a product carrier is at the recess, the actuator will not be actuated, i.e. the actuator will be in the upper position. In FIG. 6, an example of a conveyor comprising a guide rail part assembly as shown in FIG. 4 is shown. Each guide rail part assembly comprises a guide rail part 2 with an actuator 19 and an extension guide rail part 3. When such a product carrier trolley 35 enters the guide rail part, the actuator 19 will first be pressed down when the front trolley wheel 36 bears on the rearward section 17, and when the trolley continues in the moving direction 18, the front wheel will enter the recess 15, which allows the actuator 19 to resume the idle state, with the stop member 8 in the lower position. In this way, the rear wheel 37 of the trolley can pass the stop member such that the trolley can enter the guide rail part. When the rear wheel of the trolley bears on the rearward section of the actuator and/or the front wheel of the trolley bears on the forward section of the actuator, the actuator is pushed down such as the stop member will stop a following product carrier trolley to enter the guide rail part. Since the wheels of the trolley will bear on the upper surfaces of either the actuator 19, the connecting member 12 or the extension guide rail part 3, the stop member will stop further trolleys to enter the guide rail part as long as the trolley is at the guide rail part assembly. When the trolley is released from the guide rail part assembly, the stop member will be lowered and a following product carrier trolley can enter the guide rail part in the same way as described above. By connecting a desired number of extension guide rail parts to the first guide rail part, any required spacing can be obtained.

It is also possible to mount the conveyor rail with an inclination, such that the product carriers can roll by themselves from one guide rail part to the next when the stop member releases them. This may e.g. be an advantage for providing simpler sub-conveyors where a separate conveyor chain is not needed.

The invention is not to be regarded as being limited to the embodiments described above, a number of additional variants and modifications being possible within the scope of the subsequent patent claims.

REFERENCE SIGNS

1: Guide rail part assembly
2: Guide rail part
3: Extension guide rail part
4: Body
5: Side wall
6: Side wall
7: Actuator
8: Stop member
9: First pivot arm
10: Second pivot arm
11: Upper surface
12: Connecting member
13: Interrupter
14: Resilient member
15: Recess
16: Forward section
17: Rearward section
18: Moving direction
19: Actuator
20: Catch
21: Protrusion
30: Conveyor rail
31: Product carrier
32: Stop
33: Conveyor hook
34: Conveyor chain
35: product carrier trolley
36: Front wheel
37: Rear wheel

What is claimed is:

1. Guide rail part for a conveyor adapted to convey product carriers in a hanging manner,
wherein the guide rail part is adapted to be positioned centrally in a main rail of the conveyor,
wherein the guide rail part comprises a body and an actuator pivotably suspended to the body, the actuator being movable from a first upper position to a second lower position,
wherein the guide rail part comprises a stop member pivotably connected to the actuator such that the stop member is in a raised stop position when the actuator is in the second lower position and that the stop member is in a lowered bypass position when the actuator is in the first upper position,
wherein the actuator is pivotably suspended to the body by a first pivot arm and a second pivot arm such that an upper surface of the actuator is parallel to the upper surface of the body both in the first position and in the second lower position.

2. Guide rail part according to claim 1, wherein the stop member is integrated with the first pivot arm.

3. Guide rail part according to claim 1, wherein one of the first pivot arm and the second pivot arm comprises an interrupter adapted to interrupt a light beam of an optical sensor when the actuator is in the second lower position.

4. Guide rail part according to claim 1, wherein the actuator is pushed to the first upper position by a resilient member.

5. Guide rail part according to claim 1, wherein the upper surface of the actuator comprises an intermediate recess between a forward part and a rearward part of the actuator.

6. Guide rail part according to claim 1, wherein the body comprises two longitudinal parallel side walls and that the actuator is arranged between the side walls.

7. Guide rail part according to claim 1, wherein the guide rail part is modular such that the length of the guide rail part is one length unit, and wherein the guide rail part is adapted to be mounted in predefined mounting positions in a main conveyor rail having a spacing corresponding to the length unit or to a multiple of the length unit.

8. Guide rail part according to claim 1, wherein the guide rail part is manufactured of an acetal plastic and/or a polyamide.

9. Guide rail part assembly comprising;
a guide rail part according to claim 1, and
an extension guide rail part,
wherein the extension guide rail part comprises a body and an actuator pivotably suspended to the body by two pivot arms,
wherein the actuator of the guide rail part is connected to the actuator of the extension guide rail part by a connecting member such that the actuator of the guide rail part and the actuator of the extension guide rail part move at the same time.

10. Guide rail part assembly according to claim 9, wherein the body of the extension guide rail part comprises two longitudinal parallel side walls and that the actuator is arranged between the side walls.

11. Guide rail part assembly according to claim 9, wherein the guide rail part assembly comprises a plurality of extension guide rail parts and wherein the actuators of each extension guide rail part are interconnected to each other by a connecting member.

12. Guide rail part assembly according to claim 9, wherein the length of the extension guide rail part is a length unit or half a length unit, and wherein the length of the extension guide rail part corresponds to predefined mounting positions in a main conveyor having a spacing corresponding to the length unit.

13. Conveyor comprising a plurality of guide rail parts according to claim 1.

14. Conveyor according to claim 13, further comprising a plurality of guide rail part assemblies.

15. Conveyor according to claim 14, wherein the guide rail part assemblies are arranged in at least two different clusters and wherein the guide rail part assemblies of each cluster are of different lengths such that the stop members of each cluster has a different spacing.

* * * * *